United States Patent
Müller et al.

(10) Patent No.: US 10,327,276 B2
(45) Date of Patent: Jun. 18, 2019

(54) METHODS AND NETWORK NODES FOR EVALUATING A CONNECTION

(71) Applicant: Telefonaktiebolaget LM Ericsson (publ), Stockholm (SE)

(72) Inventors: Walter Müller, Upplands Väsby (SE); Rasmus Axén, Linköping (SE); Stefan Johansson, Linköping (SE); Sofia Svedevall, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/031,240

(22) PCT Filed: Jun. 12, 2015

(86) PCT No.: PCT/SE2015/050686
§ 371 (c)(1),
(2) Date: Apr. 21, 2016

(87) PCT Pub. No.: WO2016/200305
PCT Pub. Date: Dec. 15, 2016

(65) Prior Publication Data
US 2017/0188248 A1    Jun. 29, 2017

(51) Int. Cl.
*H04W 76/16* (2018.01)
*H04W 76/15* (2018.01)
(Continued)

(52) U.S. Cl.
CPC ......... *H04W 76/16* (2018.02); *H04L 43/0864* (2013.01); *H04W 24/02* (2013.01);
(Continued)

(58) Field of Classification Search
CPC .. H04L 7/0033; H04L 43/0864; H04W 24/08; H04W 24/02; H04W 76/16
See application file for complete search history.

(56) References Cited

U.S. PATENT DOCUMENTS

2014/0286258 A1* 9/2014 Chowdhury .......... H04L 1/1812
 370/329
2016/0029235 A1* 1/2016 Kim ...................... H04W 24/08
 370/252
(Continued)

FOREIGN PATENT DOCUMENTS

WO    2014206445 A1    12/2014
WO    2015015285 A2    2/2015

OTHER PUBLICATIONS

International Search Report and Written Opinion, Application No. PCT/SE2015/050686, dated Feb. 29, 2016, 11 pages.
(Continued)

*Primary Examiner* — Omer S Mian
(74) *Attorney, Agent, or Firm* — Patent Portfolio Builders, PLLC

(57) ABSTRACT

A method for evaluating a connection between a first network node and a User Equipment (UE) via a second cell. The first network node serves a first cell. A sending of a first message is initiated. The first message is sent from the first network node to the UE via the second cell. The first message comprises a trigger for the UE to respond by sending a second message comprising feedback relating to the connection to the second cell. A time value difference between the sending of said first message and receiving of said second message in the first network node is obtained. The second message comprises the feedback relating to the connection sent from the UE in response to the first message. Then it is evaluated how the connection shall be used based on the obtained time value difference and the received feedback.

11 Claims, 9 Drawing Sheets

(51) Int. Cl.
H04W 24/08 (2009.01)
H04W 24/02 (2009.01)
H04L 12/26 (2006.01)
H04W 88/06 (2009.01)
H04W 64/00 (2009.01)

(52) U.S. Cl.
CPC .......... *H04W 24/08* (2013.01); *H04W 76/15* (2018.02); *H04W 64/00* (2013.01); *H04W 88/06* (2013.01)

(56) References Cited

U.S. PATENT DOCUMENTS

2016/0262118 A1    9/2016  Kim et al.
2016/0302129 A1*  10/2016  Lohr ................. H04W 72/0446

OTHER PUBLICATIONS

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Dec. 2014, 251 pages, V12.4.0, 3GPP Organizational Partners.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 12)," Dec. 2014, 410 pages, V12.4.0, 3GPP Organizational Partners.

3GPP TS 36.425, "3rd Generation Partnership Project; Technical Specification Group Radio Access Network; Evolved Universal Terrestrial Radio Access Network (E-TRAN); X2 interface user plane protocol (Release 12)," Dec. 2014, 15 pages, V12.0.0, 3GPP Organizational Partners.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 12)," Dec. 2014, 60 pages, V12.4.0, 3GPP Organizational Partners.

International Preliminary Report on Patentability for International Application No. PCT/SE2015/050686, dated Dec. 21, 2017, 8 pages.

* cited by examiner

METHODS AND NETWORK NODES FOR EVALUATING A CONNECTION

CROSS-REFERENCE TO RELATED APPLICATIONS

This application is a National stage of International Application No. PCT/SE2015/050686, filed Jun. 12, 2015, which is hereby incorporated by reference.

TECHNICAL FIELD

Embodiments herein relate to methods, a first network device, and a second network device. In particular, they relate to evaluating a connection between a first network node and a User Equipment via a second cell.

BACKGROUND

Wireless devices or terminals for communication are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or low power base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to one or several cells served by one or several base stations or a wireless device, depending on the direction of the communication. In the context of this disclosure, the expression Downlink (DL) is used for the transmission path from the base station(s) to a wireless device. The expression Uplink (UL) is used for the transmission path in the opposite direction i.e. from the wireless device to the base station(s).

Universal Mobile Telecommunications System (UMTS) is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is mainly controlled by the radio base station.

Dual Connectivity

3GPP have recently introduced support for Dual Connectivity (DC). This feature allows RAN to use resources from two cells served by different eNBs for supporting RAN/UE connectivity for a wide range of eNB interconnect latencies.

This is similar to the 3GPP concept of Carrier Aggregation (CA) that allows RAN to use resources from more than one cell served by one eNB for supporting connectivity between the RAN and a UE. A non 3GPP solution for CA can be generalized to allow RAN to use resources from more than one cell served by a different eNB but only if interconnect latency between eNBs are small enough to allow that.

Below some DC terms and other terms used herein are defined:

Cell Group: in dual connectivity, a group of serving cells associated with either the MeNB or the SeNB.

Dual Connectivity: mode of operation of a UE in Radio Resource Control (RRC)_CONNECTED, configured with a Master Cell Group and a Secondary Cell Group.

Master Cell Group: in dual connectivity, a group of serving cells associated with the MeNB, comprising of the PCell and optionally one or more SCells.

Master eNB: in dual connectivity, the eNB which terminates at least S1-Mobility Management Entity (MME).

MCG bearer: in dual connectivity, a bearer whose radio protocols are only located in the MeNB to use MeNB resources only.

Secondary Cell Group (SCG) bearer: in dual connectivity, a bearer whose radio protocols are only located in the SeNB to use SeNB resources.

Secondary Cell Group: in dual connectivity, a group of serving cells associated with the SeNB, comprising a PCell and optionally one or more SCells.

Secondary eNB: in dual connectivity, the eNB that is providing additional radio resources for the UE but is not the Master eNB.

Split bearer: in dual connectivity, a bearer whose radio protocols are located in both the MeNB and the SeNB to use both MeNB and SeNB resources.

X2 is also used as the interface between a MeNB and an SeNB.

Accordingly, there are two roles defined for eNBs that are involved in DC towards a UE, the MeNB and the SeNB. The MeNB is the only eNB that supports RRC connectivity towards the UE.

It is also the MeNB that initiate a setup of a SeNB connection to a UE via X2 Application Protocol (X2 AP) signaling towards SeNB and RRC signaling from MeNB towards the UE. X2 is an interface between eNBs that carry both user plan data and Control plane data.

There are two main options per data bearer, split bearer and direct SCG bearer.

Today both CA and DC are used for increasing user throughput by aggregating resources from different cells and/or carriers and by that get a combined gain. It has also been suggested to use resources from the same carrier but from different cells and by that achieve a layer 3 diversity gain and use that to improve mobility robustness, such as e.g. the concept of RRC diversity. Layer 3 is the network layer according to the Open Systems Interconnection (OSI) model.

Today there are two typical types of solutions for how an eNB can evaluate if an additional connection should be setup via a new cell or not.

In the first solution the eNB is configured to always try to setup and start using a connection from a specific secondary Cell towards the UE for transmission of user data. If the connection setup fails or is considered as useless for sending user data after setup as indicated by either Medium Access Control (MAC) layer e.g. by detection of DL HARQ nack or no or CRC faulty transmission in UL and/or, UE reported Channel Quality Indication (CQI) indicating poor DL quality and/or, Power Headroom Report (PHR) indicating lack of UE power feedback from a UE, or a UE RRC layer measurement report is triggered such as an A2 event which is when signals via the serving cell becomes worse than a threshold, then the additional carrier will either be released e.g. for the potential favor of some other carrier, or just deactivate transmission of user data on that carrier waiting for the connection to improve.

In the second solution the eNB is configured to start Layer 3 measurements first and only after a RRC measurement report as feedback that indicates that the secondary cell is good enough which is referred to as event A4 or A51, or best on that frequency and better than current serving cell which is referred to as event A36, the eNB initiates a connection setup from the new cell to the UE and start using a connection from the new secondary Cell towards the UE for transmission of user data.

The problems with the first solution is that there are signaling and some resources unnecessary wasted in SeNB and MeNB and UE before information that the intended new connection is not really useful for data transmission is received.

The problem with the second solution is that an Inter frequency measurement using measurement gap typically needs to be used, implying delays for getting a measurement report a higher drop risk and lower peak throughput and higher battery consumption, and when feedback is actually received that the new connection is useful the main part of the data may already have been sent from MeNB so there is no need for a new connection.

SUMMARY

It is therefore an object of embodiments herein to improve the performance of providing additional resources for a UE in a wireless communications network.

According to a first aspect of embodiments herein, the object is achieved by a method for evaluating a connection between a first network node and a User Equipment, UE, via a Second Cell. The first network node serves a first cell.

A sending of a first message is initiated. The first message is sent from the first network node to the UE via the second cell. The first message comprises a trigger for the UE to respond by sending a second message comprising feedback relating to the connection to the second cell.

A time value difference between the sending of said first message and receiving of said second message in the first network node is obtained. The second message comprises the feedback relating to the connection sent from the UE in response to the first message.

Then it is evaluated how the connection shall be used based on the obtained time value difference and the received feedback.

According to a second aspect of embodiments herein, the object is achieved by a method for assisting an evaluating a connection between a first network node and a User Equipment, UE, via a second cell. The first network node is a Master eNodeB, MeNB, and the second network node is a Secondary eNodeB, SeNB, serving the second cell.

The second network node receives a first message from the first network node and forwarding the first message to the UE. The first message comprises a trigger for the UE to respond by sending a second message to the second cell.

The second network node receives from the UE the second message. The second message comprises feedback from the UE. The feedback relates to the condition of said connection. The feedback is a response to the first message.

The second network node then sends the second message to the first network node. The second message is used by the first network node to evaluate how the connection shall be used.

According to a third aspect of embodiments herein, the object is achieved by a first network device for evaluating a connection between a first network node and a User Equipment, UE, via a Second Cell. The first network node is adapted to serve a first cell. The first network device is configured to:

initiate to send, from the first network node to the UE via the second cell, a first message comprising a trigger for the UE to respond by sending a second message comprising feedback relating to the connection to the second cell;

obtain a time value difference between the sending of said first message and receive said second message in the first network node, which second message comprises the feedback relating to the connection sent from the UE in response to the first message; and evaluate how the connection shall be used based on the obtained time value difference and the received feedback.

According to a fourth aspect of embodiments herein, the object is achieved by a second network device, for assisting a first network node in evaluating a connection for a User Equipment, UE, via a second cell. The first network node is adapted to be a Master eNodeB, MeNB, and the second network node is adapted to be a Secondary eNodeB, SeNB, serving the second cell. The second network device is configured to:

receive a first message from the first network node and forward the first message to the UE, which first message is adapted to comprise a trigger for the UE to respond by sending a second message to the second cell, receive from the UE the second message, which second message comprises feedback from the UE, which feedback relates to the condition of said connection, and which feedback is a response to the first message, and send the second message to the first network node, which second message is used by the first network node to evaluate how the connection shall be used.

An advantage is that embodiments herein allow to setup and prepare for multi cell usage before a radio connection carrying user data really exists and then detect that there is a bidirectional connection possible and the DL and UL quality of that connection is above a threshold, i.e. a good enough DL connection from the second cell to the UE and also a good enough UL connection from the UE to the second cell.

The embodiments also allow that information about typical latency conditions to be expected for the use of the second cell. The total latency comes from inter connect latency between eNBs and latency due to scheduling delays and UE response delays.

The embodiments also allow the information to be collected without using UE inter frequency measurements but rather instead utilize the UE dual connectivity capability to avoid inter frequency measurements and the need for measurement gaps.

BRIEF DESCRIPTION OF THE DRAWINGS

Examples of embodiments herein are described in more detail with reference to attached drawings in which.

DETAILED DESCRIPTION

Figure 1:
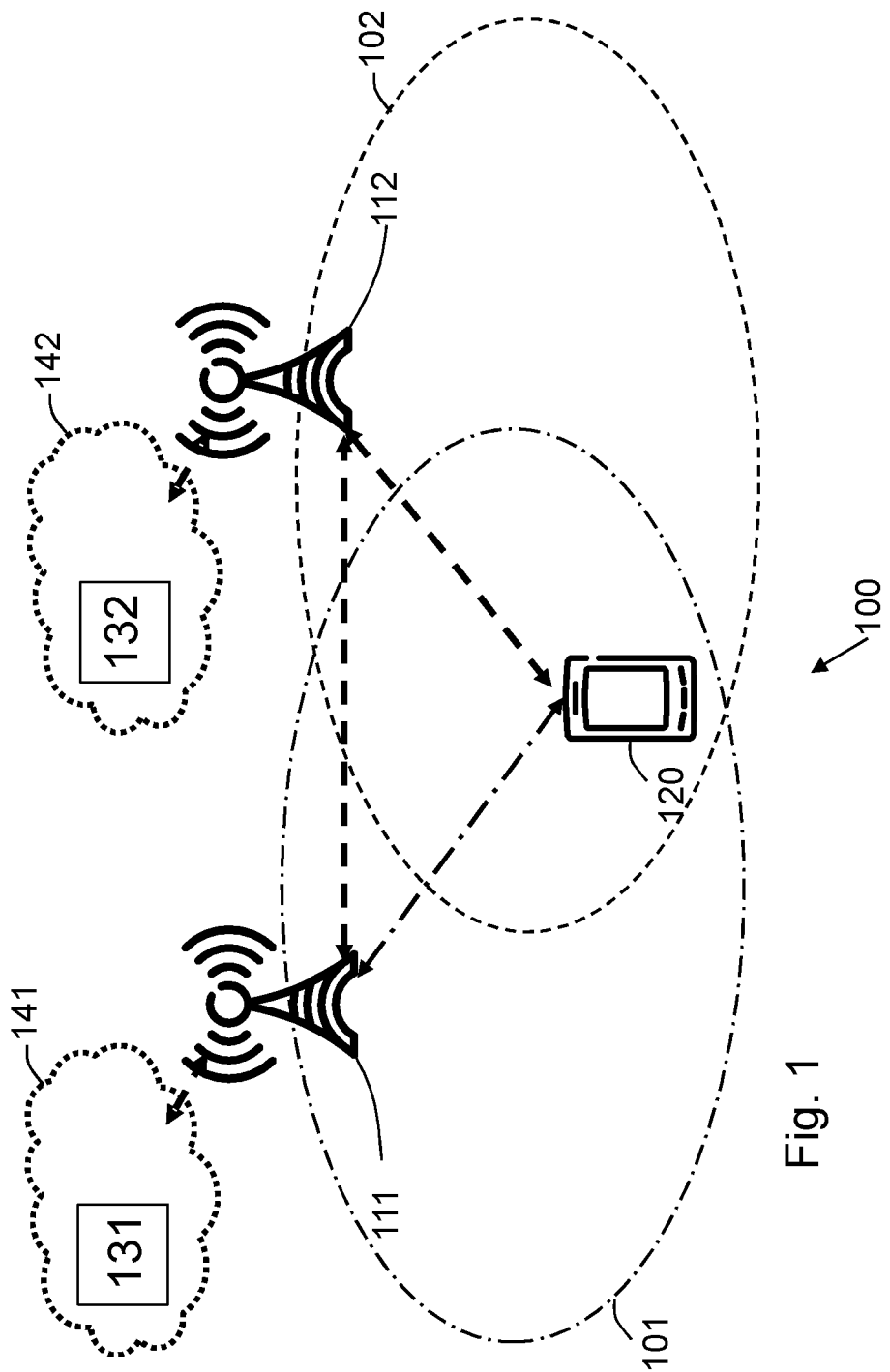
FIG. 1 is a schematic block diagram illustrating embodiments of a first scenario.

FIG. 1 depicts an example of a wireless communications network 100 according to a first scenario in which embodiments herein may be implemented.

The wireless communications network 100 may be a wireless communication network such as an LTE, WCDMA, GSM network, or any 3GPP cellular network, WiFi, Wimax, or any cellular network or system. The network may also comprise a mixture of cells that support different Radio Access Technologies (RATs).

The wireless communications network 100 comprises a plurality of cells, wherein in FIG. 1, only two cells, a first cell 101 marked with a dashed dotted line and a second cell 102 marked with a dashed line are shown and discussed for simplicity. Embodiments herein relate to multi cell usage and therefore at least two cells are comprised in the wireless communications network 100. The second cell 102 may be seen as a candidate cell for a connection for the UE 120 for a data transmission, which connection via the second cell 102 need to be evaluated. In the first example scenario according to some embodiments, the first cell 101 and the second cell 102 are served by a respective network node, while in a second scenario according to some other embodiments herein, shown in FIG. 2 below, the first cell 101 and a second cell 102 are served by the same network node.

A plurality of network nodes operate in the wireless communications network 100 whereof in the first scenario two, a first network node 111 and a second network node 112 are depicted in FIG. 1. The first network node 111 and the second network node 112 are network nodes which each may be a transmission point such as a radio base station, for example a NodeB, an eNodeB, or an Home Node B, an Home eNode B, a WiFi Access Controller (AC), a 5G air interface technology node, or UMTS Radio Network Controller (RNC) or any other network node capable of serving a UE in a wireless communications network. In the first scenario according to FIG. 1, the first network node 111 serves the first cell 101 and the second network node 112 serves the second cell 102. The first network node 111 and the second network node 112 support multi cell usage for a connection to a UE. The multi cell usage in the first scenario may relate to DC. In that case the first network node 111 is a MeNB, and the second network node 112 is a SeNB.

The term cell used herein shall be interpreted as a generic term and may also be associated with an area covered by an antenna beam.

A UE 120 operates in the wireless communications network 100. The UE 120 is served by the first network node 111.

The UE 120 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term UE used in this document also covers other wireless devices such as Machine to machine (M2M) devices.

According to the first scenario, the UE 120 is in radio range of the first network node 111 and may be in radio range of the second network node 112. This means that it can hear signals from the first network node 111 and may be also from the second network node 112. The UE 120 supports multi cell usage. As mentioned above, the multi cell usage in the first scenario may relate to DC.

A method according to the first scenario is performed by the first network node 111. As an alternative, a first distributed node 131 and functionality, e.g. comprised in a first cloud 141 may be used for performing the method. An RRC termination point may be located in a cloud server, or if SCG bearer is used it is up to a Core Network (CN) node such as e.g. a Serving Gateway (SGW) to do the probing.

The method according to the first scenario is also to be performed by the second network node 112. As an alternative, a second distributed node 132 and functionality, e.g. comprised in a second cloud 142 may be used for performing the method. An RRC termination point may be located in a cloud server, or if SCG bearer is used it is up to a CN node such as e.g. a SGW to do the probing.

The method will be described below.

Figure 2:
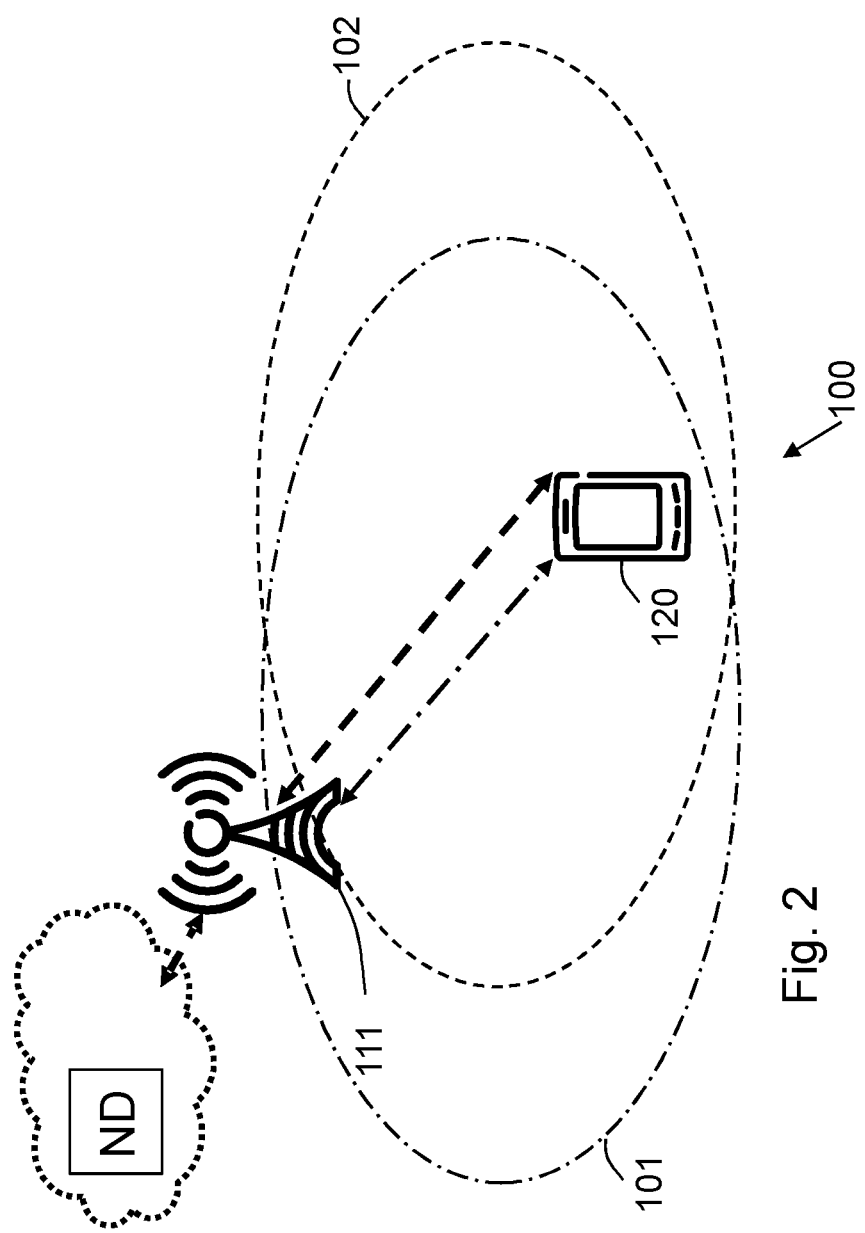
FIG. 2 is a schematic block diagram illustrating embodiments of a first scenario.

FIG. 2 depicts an example of the wireless communications network 100 according to a second scenario in which embodiments herein may be implemented.

In the second scenario both the first cell 101 and the second cell 102 are served by the first network node 111. The multi cell usage in the second scenario relates for example to CA. In cases of CA, the first cell 101 may be referred to as a Primary Cell (PCell) and the second cell 102 may be referred to as a Secondary Cell (SCell). In other words, comparing to FIG. 1, the first network node 111 is the same node as the second network node 112 serving both the first cell 101 and the second cell 102.

As in the first scenario, the UE 120 is served by the first network node 111 and the UE 120 supports multi cell usage. However, according to the second scenario the multi cell usage supported by the UE 120 may for example relate to CA.

A method according to the second scenario is performed by the first network node 111. As an alternative, the first distributed node 131 and functionality, e.g. comprised in the first cloud 141 may be used for performing the method. An RRC termination point may be located in a cloud server, or if SCG bearer is used it is up to a CN node such as e.g. a SGW to do the probing.

Thus embodiments herein relate to any multi cell usage which e.g. may relate to DC according to the first scenario, to CA according to the second scenario, Inter Radio Access Technology (IRAT) aggregation, or to any other multi cell usage. Methods herein allow to setup multi cell usage without a prior knowledge that a bidirectional radio connection really exist and then detect that there is a bidirectional connection that is good enough, e.g. a signal quality of the connection is above a threshold, or better than the current connection to also support user data transfer. That is a DL connection from the second cell 102 to the UE 120 and also an UL connection from the UE 120 to the second cell 102 which here means a DL connection from the first network node 111 via the second cell 102 to the UE 120 and also an UL connection from the UE 120 to the first network node 111 via the second cell 102.

In an example the first network node 111 is connected to the UE 120 via the first cell 101 marked with a dashed dotted line in the figures. According to embodiments herein the first network node 111 is allowed to set up a connection via the second cell 102, marked with a dashed line in the figures, initially to avoid to send a large amount of user data without prior knowledge of channel conditions which may waste resources since the transmission will fail and lead to re-segmentation and retransmissions, embodiments herein provide that only MAC control or a small amount of user data will be used to probe and monitor a new connection to the UE 120 via the second cell 102. This is to use the small amount of data from the second cell 102 to probe or try, and detect if the second cell 102 has good enough radio conditions to the UE 120 so a bidirectional connection is possible at all.

An example according to the first scenario, allows an MeNB to setup SeNB connections initially by e.g. using a DC option Split Bearer and use a small amount of data to probe and monitor a new SeNB connection.

Figure 3:
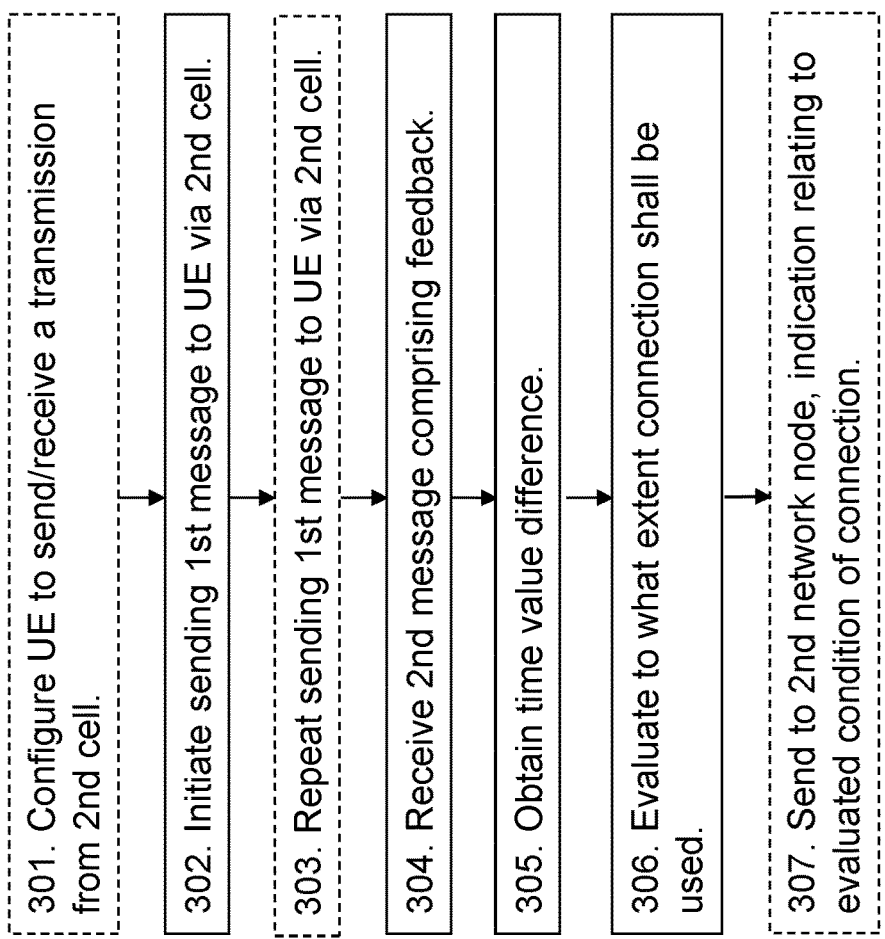
FIG. 3 is a flowchart depicting embodiments of a method in a first network node.
Figure 4A:
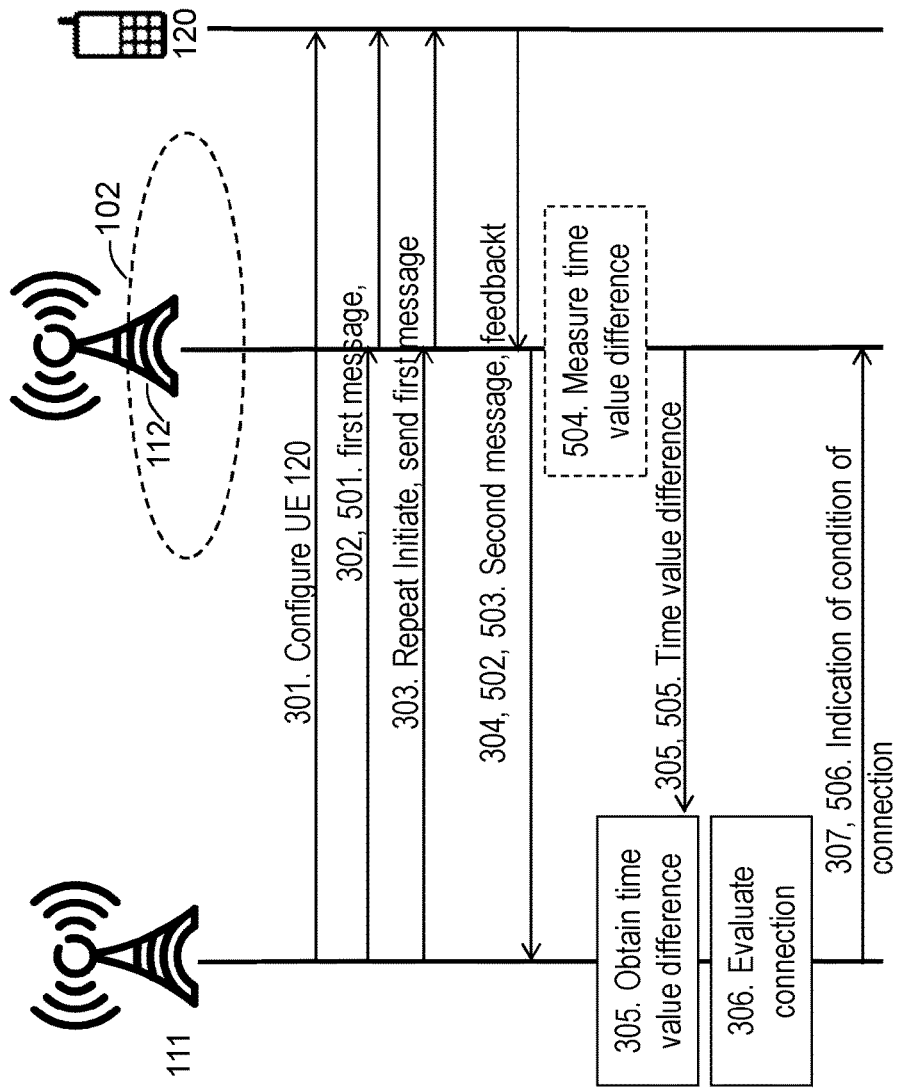
FIG. 4a is a sequence diagram illustrating embodiments of a first scenario.
Figure 4B:
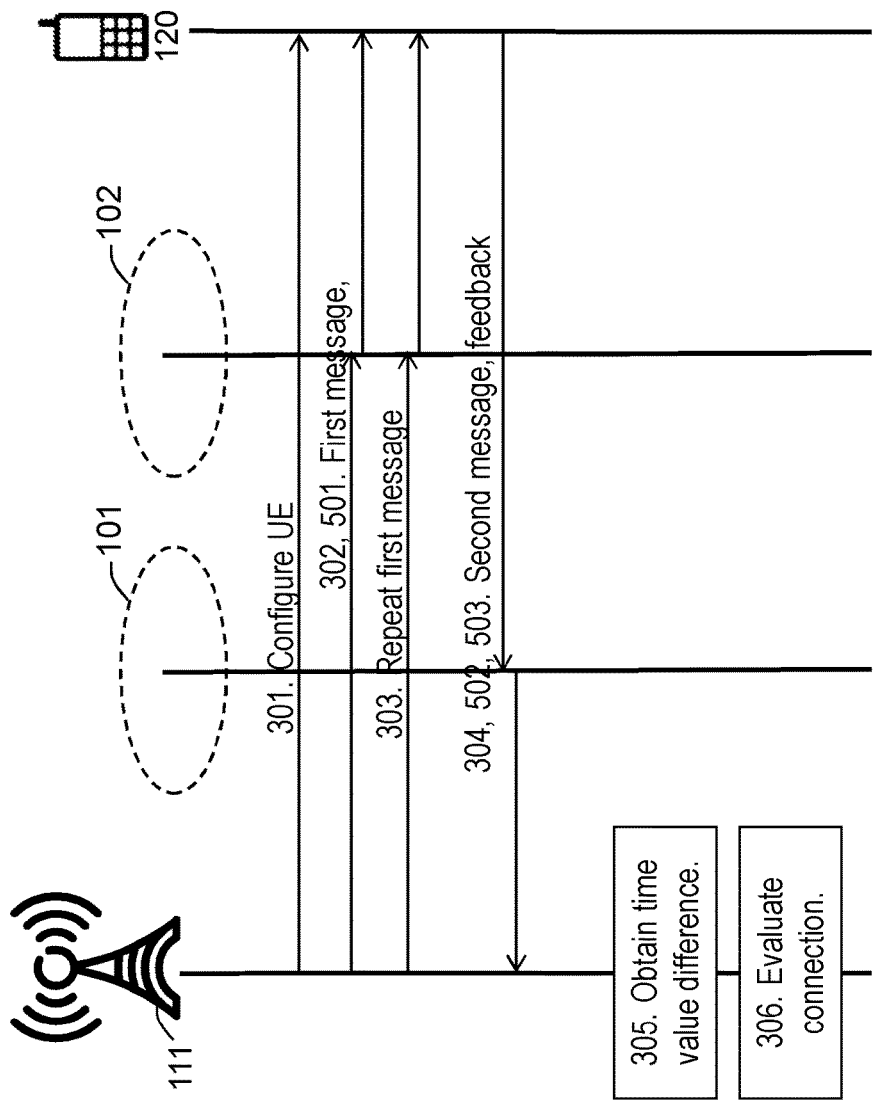
FIG. 4b is a sequence diagram illustrating embodiments of a second scenario.

Example embodiments of a method for evaluating a connection between the first network node 111 and the UE 120 via a second cell 102, will now be described with reference to a flowchart depicted in FIG. 3 and a sequence diagram according to the first scenario depicted in FIG. 4a and a sequence diagram according to the second depicted in FIG. 4b. As mentioned above the first network node 111 serves the first cell 101.

The method may be performed by the first network node 111. As an alternative as mentioned above, the first distributed node 131 and functionality, e.g. comprised in the first cloud 141 may be used for performing the method. An RRC termination point may be located in a cloud server, or if SCG bearer is used it is up to a CN node such as e.g. SGW to do the probing.

The method comprises the following actions, which actions may be taken in any suitable order.

In an example, data is to be sent between the first network node 111 and the UE 120. The UE 120 is connected to the first network node 111 via the first cell 101, however an additional connection via the second cell 102 for the data to be sent on is desirable. The reason for this may e.g. be for increasing user throughput by aggregating resources from different cells and/or carriers and by that get a combined gain wherein both CA according to the first scenario and DC according to the second scenario may be used. The network node 111 therefore needs to know the condition of a connection via the second cell 102 as soon as possible.

Action 301

The connection via the second cell 102 to the UE 120 may not be completely setup in order to start to probe the condition of the connection. However, the second network node 112 and the connection between first network node 111 and second network node 112 shall preferably be setup before the UE 120 can receive signals via the second cell 102. The UE 120 may be configured via the first cell 101 to at least try to receive the second cell 102. Note that in this document, the UE 120 receiving a cell means that the UE 120 receives signals via the network node serving that cell. The second cell 102 may be configured to schedule the UE 120 with a small amount of data such that the UE 120 responds on MAC level by transmitting, and at least try to receive feedback from the UE 120 in UL of the second cell 102. The first network node 111 or any other network node in the wireless communications network 100 such as e.g. an eNB, an MME, an RNC or an AC may configure the UE 120 and the second cell 102. Thus in an example of embodiments herein, the UE 120 is configured to send and receive a transmission from the second cell 102.

Action 302

This action relates to either the first network node 111 both initiates and sends a first message, or according to some embodiments, any network node such as the distributed node 131 initiates the sending of the first message and the first network node 111 performs the sending.

Therefore, a sending of a first message, from the first network node 111 to the UE 120 via the second cell 102 is initiated. As mentioned above, the initiating of the sending of the first message and the performing of the sending of the first message may be both performed by the network node 111. As an alternative another node such as e.g. the distributed node 131, another eNB or RNC initiates the sending by instructing the first network node 111 to send the first message, the first network node 111 then acts accordingly and performs the sending of the first message. The term "initiate" used here typically means sending a control message to the network node 111, that makes the network node 111 transmit the first message in a specific cell, here the second cell 102 as pointed out in the control message.

The initiating of sending the first message to be able to probe the connection via second cell 102 may e.g. start based on preconfigured information such as amount of data stored in a buffer waiting to be transmitted in the first node, e.g. performed in action 301 above, in the first network node 111, or it may e.g. be triggered by a measurement report from the UE 120. Here are examples of some events that are useful for this purpose.

Inter frequency, A3: Signals of a neighbor cell becomes offset better than signals of a PCell, which in embodiments herein relate to that signals of the second cell 102 becomes offset better than signals of the first cell. Note that offset can be set to be negative.

A4: Signals of a neighbor cell becomes better than a threshold, which in embodiments herein relate to that signals of the second cell 102 becomes better than a threshold.

A5: Signals of a PCell becomes worse than a threshold 1, and signals of a neighbor becomes better than a threshold 2, which in embodiments herein relate to that signals of the first cell 101 becomes worse than the first threshold and that signals of the second cell 102 becomes better than the second threshold.

B2: Signals of a PCell becomes worse than a threshold 3 and signals of inter RAT neighbor cell becomes better than threshold 4, which in embodiments herein relate to that signals of the first cell 101 becomes worse than a third threshold and that signals of the second cell 102 here being an inter RAT cell, becomes better than a fourth threshold.

A6: Signals of a neighbor cell becomes offset better than signals of an SCell, which in embodiments herein relate to that signals of a neighbor cell on the same frequency as the second cell 102 becomes offset better than signals of the second cell 102.

A3, A4, A5, B2, and A6 relates to conditions where it can be suitable to start probing.

The first message comprises a trigger for the UE 120 to respond by sending a second message comprising feedback relating to the connection to the second cell 102. The trigger may e.g. be an activation of the second cell 102.

As mentioned in an example above, the first network node 111 is allowed to set up a connection early, and use a small amount of data, which may mean a limited amount of data to probe and monitor a new connection to the UE 120 via the second cell 102. Thus according to this example, the first message comprises a limited amount of data, which is limited to the amount of data that is required by the UE 120 to be able to respond to. The small amount of data could be second cell 102 activation and UL grant and/or some small amount of DL user data.

Action 303

For example, sometimes no response to the first message is received by the first network node 111 within a reasonable time, then the first network node 111 will try to initiate sending of the first message again to see if any response can be received to the repeated first message. The reason for this may e.g. be poor radio connection between the UE 120 and the second cell 102. Thus, when not receiving within a time period, any second message comprising feedback from the UE 120 in response to the first message, the network node 111 may repeat to send the first message to the UE 120 via the second cell 102. The first message comprising a trigger for the UE 120 to respond by sending a second message comprising feedback relating to the connection to the second cell 102.

Action 304

As soon as the UE 120 receives the second cell 102 in DL the UE 120 will start responding to the first message, by giving feedback such as e.g. PHR report, Hybrid Automatic Repeat reQuest (HARQ) and Radio Link Control (RLC) feedback in the SCG cell UL. According to the first scenario, the second network node 112 will provide this feedback to the first network node 111 in the second message. According to the second scenario, the UE 120 may provide the feedback in the second message to the first network node 111 via the first cell 101.

Thus said second message is received in the first network node 111. The second message comprises the feedback relating to the connection sent from the UE 120 in response to the first message.

As mentioned above, in some embodiments according to the first scenario, the first network node 111 is a MeNB serving the first cell 101, and the second network node 112 is a SeNB serving the second cell 102, and the connection relates to Dual Connectivity. In these embodiments, the second message comprising the feedback from the UE 120 is received from the UE 120 via the second cell 102.

As also mentioned above, in some other embodiments according to the second scenario, the first network node 111 is the same node as the second network node 112 serving both the first cell and the second cell 102, and the connection relates to Carrier Aggregation. In these embodiments, the second message comprising the feedback from the UE 120 is received from the UE 120 via the first cell 101.

Action 305

The probing and monitoring is performed by measuring the time value difference. The time value difference may e.g. be an RTT. The RTT is the length of time it takes for a signal to be sent plus the length of time it takes for the signal to be processed by the receiver and an acknowledgment of that signal to be received by the transmitter. This time delay therefore comprises the propagation times between the two points of a signal. This is similar to the use of a ping to measure RTT for Internet connections.

A ping operates by sending Internet Control Message Protocol (ICMP) echo request packets to a target host and waiting for an ICMP echo reply. It measures the round-trip time from transmission to reception and reports errors and packet loss.

The first network node 111, the second network node 112 or any other network node will then perform time value difference measurements such as e.g. RTT measurements. If performed by another network node than the first network node 111, the measurement result will be provided by the other network node to the first network node 111. Accordingly, a time value difference between the sending of said first message and receiving of said second message in the first network node 111 is obtained.

The time value difference for sending of the first message and receiving of the second message in the second cell is for example obtained by being measured by the first network node 111.

Alternatively, the time value difference for sending of the first message and receiving of the second message in the second cell 102 is obtained by being received from the second network node 112.

The time value difference may relate to a round trip path, such as e.g. RTT.

In an example, the time value difference relates to a first round trip path comprising the first network node 111, a second network node 112, the UE 120, the second network node 112, the first network node 111.

In a further example, the time value difference relates to a second round trip path comprising the second network node 112, the UE 120, the second network node 112.

In a yet further example, the time value difference relates to a third round trip path comprising the first network node 111, the second network node 112, the first network node 111.

The third round trip path may be estimated based on the first round trip path and the second round trip path. E.g. by knowing the first round trip path and the second round trip path, the third round trip path is estimated as equal to the first round trip path minus the second round trip path.

The time value difference may relate to a round trip path also in the embodiments according to the second scenario, here data is scheduled from second cell 102 but the UE 120 responds on the first cell 101.

As mentioned in above, the time value difference may relate to a round trip path, such as e.g. RTT. E.g. a round trip path according to the first scenario comprises the first network node 111/the second network node 112/the UE 120, such as MeNB/SeNB/UE, RTT on a ping type of user plane message, which message is sent from the first network node 111 to the second network node 112 and which message is responded back by the second network node 112. A round trip path according to the second scenario may comprise, the first network node 111/the UE 120 via the second cell 102 RTT on a ping type of user plane message, which message is sent from the first network node 111 to the UE 120 via the first cell 101 and which message is responded back to the first network node 111 via the first cell 101 network node 112.

E.g. the round trip path comprising the second network node 112/the UE 120, such as the SeNB/UE, path RTT may be measured by using a small amount of data or only a RLC poll message and the UE 120 will respond in an RLC status message on the bearer that is split to also go over the second cell 102.

The ping response received by the first network node 111 from the second network node 112 comprises feedback from UE 120 such e.g. CQI, PHR and information about conditions of UL from the UE 120 to the second network node 112, that the second network node 112 monitors like UL Signal to Noise and interference conditions. There may also be information included about HARQ/RLC retransmissions statistics besides the timing information needed for RTT estimation.

One alternative to transfer this kind of information over X2 UP is to complement the solution used for DC flow control.

Action 306

It is then evaluated how, or to what extent, the connection shall be used based on the obtained time value difference and the received feedback.

The UE feedback sent to Node 112 and further transferred to node 111 may for example in LTE be Channel state information (CSI) sent on PUCCH or a MAC control message sent on PUSCH.

The UE transmission with feedback may be sent directly to node 111 in case of Carrier aggregation.

If enough UL grant is given for transmission on PUSCH to UE the UE may send both MAC control message and radio bearer user data.

This action may be performed by the network node 111 or any other node such as e.g. an eNB, an RNC, an MME, an AC.

When the limited amount of data such as e.g. the dummy data seems to go through the second cell 102 and the feedback indicate reasonable channel quality it may be determined that conditions are favorable for the connection via the second cell 102. When the conditions are favorable for the connection via the second cell 102, the split ratio for the data transmission between the first cell 101 and the second cell 102 may be changed.

The information obtained by using the probing and evaluation as described above may be used e.g. for the following for decisions:

Whether or not the second network node 112 shall be used for the data transmission at this moment.

Whether this connection over the second network node 112 is better or worse than any connections available via the first network node 111 using CA.

Whether or not the second network node 112 DL conditions is better than the first network node 111 DL conditions for the UE 120.

Whether the second network node 112 UL conditions is better than the first network node 111 UL conditions for the UE 120.

The backhaul delay and RTT between the first network node 111 and the second network node 112, to adjust window size for flow control between the first network node 111 and the second network node 112.

The scheduling delay in the second network node 112, for data coming from the first network node 111.

The end to end RTT between the first network node 111 and the UE 120 and back again for this kind of data flow.

Action 307

In this optional action, the first network node 111 sends an indication to the second network node 112. The indication relates to the evaluated condition of the connection.

The second network node may use the indication to know that only a small amount of data "first message" shall be sent for probing reasons.

For example, if the UE 120 has no data to send there will anyhow be a transmission from the UE 120 with padding according to the LTE standard 3GPP TS 36.321 v12.4.0. Padding is performed in a MAC Protocol Data Unit (PDU) to align the size of the MAC PDU with the Transport Block size.

The quality of an UL transmission of feedback from the UE 120 may be measured by the first network node 111 or the second network node 112 and if Noise to Interference measured on UL, the UL quality may be estimated by the first network node 111 or the second network node 112. This information may also be added to the content of the second message.

Figure 5:
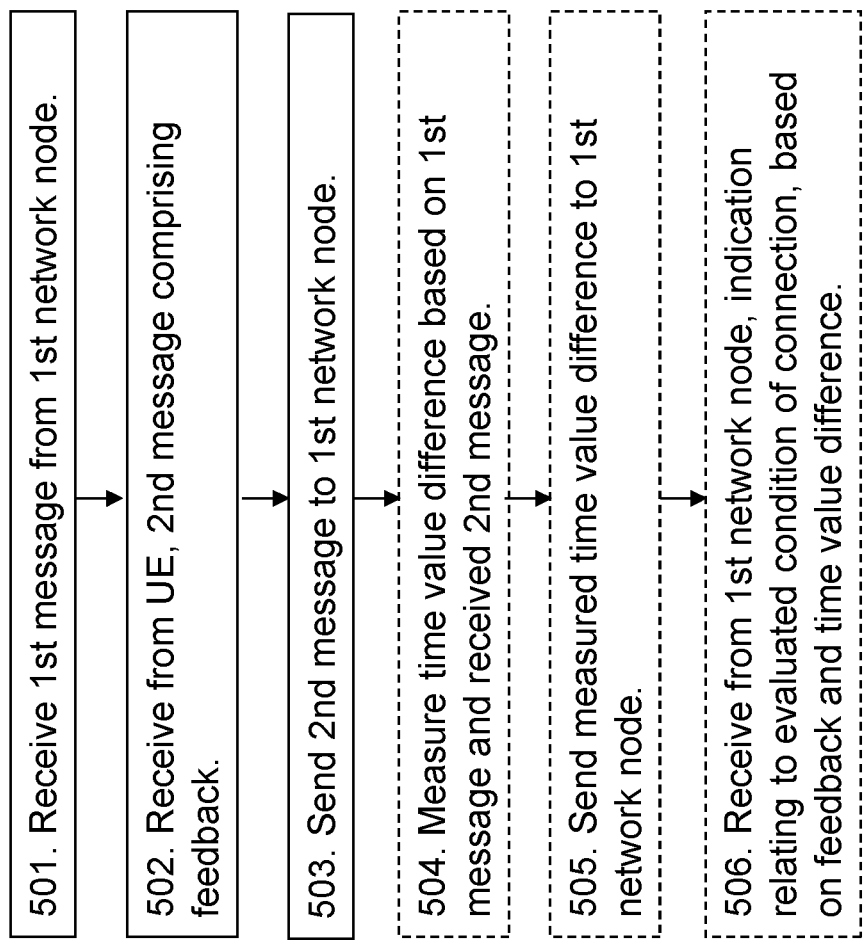
FIG. 5 is a flowchart depicting embodiments of a method in a second network node.

Example embodiments of a method, for assisting a first network node 111 in evaluating a connection for the UE 120 via the second cell 102, will now be described with reference to the sequence diagram depicted in FIG. 4*a* according to the first scenario and to a flowchart depicted in FIG. 5. This method relates to embodiments according to the first scenario wherein the first network node 111 is a MeNB and wherein the second network node 112 is a SeNB serving the second cell 102.

The method may be performed by the second network node 112. As mentioned above, as an alternative the second distributed node 132 and functionality, e.g. comprised in the cloud 142 may be used for performing the method. An RRC termination point may be located in a cloud server, or if SCG bearer is used it is up to a CN node such as e.g. a SGW to do the probing.

The method comprises the following actions, which actions may be taken in any suitable order.

Action 501

The first message is received from the first network node 111 and forwarded to the UE 120. The first message comprises a trigger for the UE 120 to respond by sending a second message to the second cell 102.

It has been described how this action is performed in Action 302 above.

Action 502

The second message is received from the UE 120. The second message comprises feedback from the UE 120. The feedback relates to the condition of said connection, which feedback is a response to the first message.

It has been described how this action is performed in Action 304 above.

Action 503

The second message is sent to the first network node 111, which second message is used by the first network node 111 or the first distributed node 131 to evaluate how the connection shall be used.

It has been described how the evaluation is performed in Action 306 above.

Action 504

The time value difference may be measured by the first network node 111 or the second network node 112 such as in Action 305 or by any other network node. Thus in some embodiments, a time value difference is measured, based on the received first message and received second message. The measurement may be performed by the second network node 112 such as the SeNB that controls when the first message is sent and can note when the second message is ready to be sent from UE 120, e.g. the UE 120 is ready to send scheduling request, and if the UE 120 is UL granted also when the second message is received.

As mentioned in Action 305 above, the time value difference may relate to a round trip path, such as e.g. RTT. E.g. a round trip path according to the first scenario comprises the first network node 111/the second network node 112/the UE 120, such as MeNB/SeNB/UE, RTT on a ping type of user plane message, which message is sent from the first network node 111 to the second network node 112 and which message is responded back by the second network node 112 in Action 505 below.

E.g. the round trip path comprising the second network node 112/the UE 120, such as the SeNB/UE, path RTT may be measured by using a small amount of data or only a RLC poll message and the UE 120 will respond in an RLC status message on the bearer such as the split bearer setup from the first network node 111 to the second network node 112.

Figure 6:
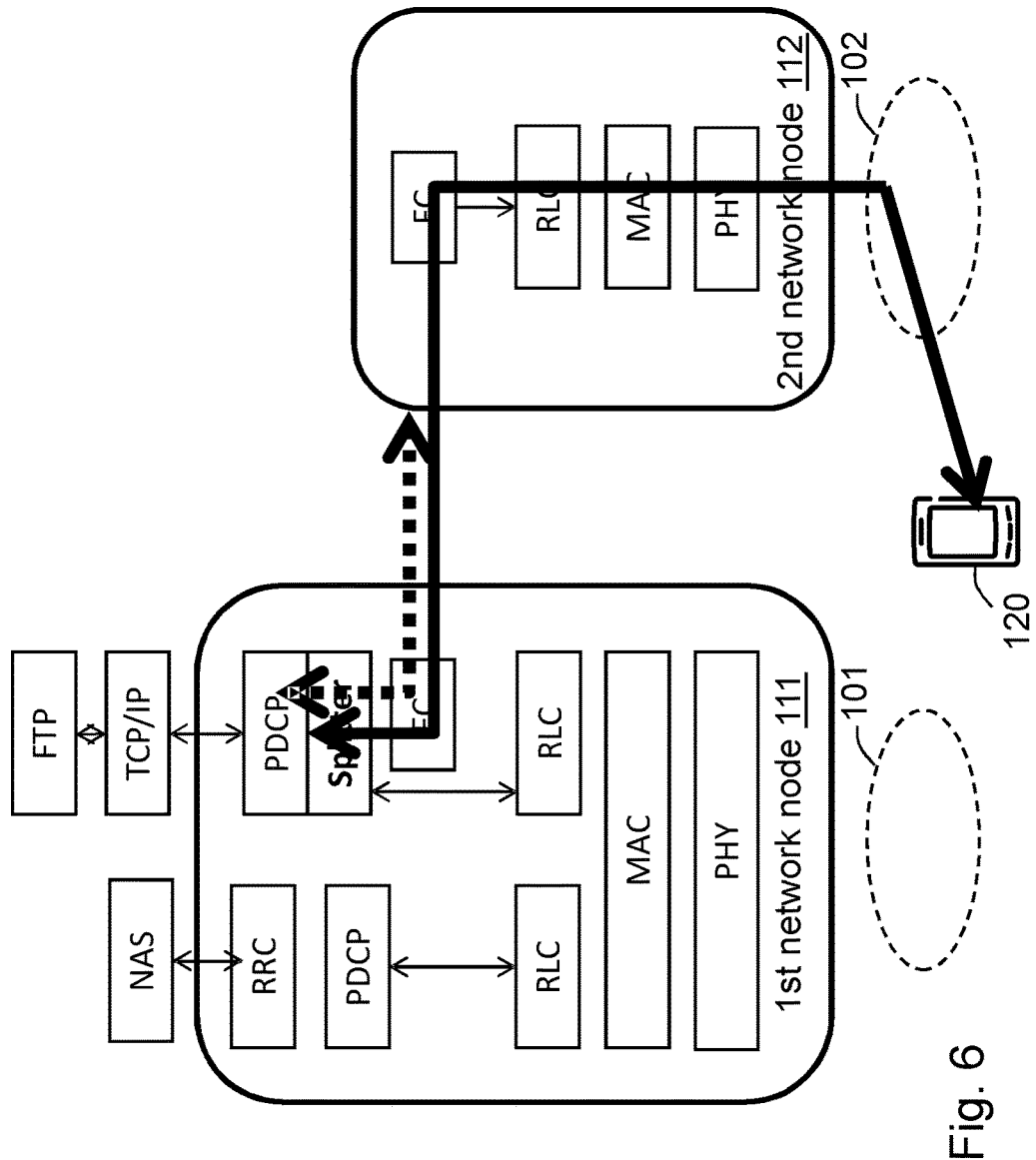
FIG. 6 is a schematic block diagram illustrating embodiments of a first scenario.

FIG. 6 depicts the protocol stacks for the first network node 111 and the second network node 112 and indicates the two example RTT loops used for evaluation MeNB/SeNB RTT marked by a solid arrow and MeNB/SeNB/UE RTT marked by a dashed arrow.

In FIG. 6, some abbreviations not mentioned above, are as follows:

NAS relates to Non-Access-Stratum,
PDCP relates to Packet Data Convergence Protocol,
PHY relates to Physical layer,
FTP relates to File Transfer Protocol,
TCP/IP relates to Transmission Control Protocol/Internet Protocol,
FC relates to Flow Control
RLC relates to Radio Link Control.
MAC relates to Medium Access Control Action 505

Referring again to FIG. 5, in the embodiments where action 504 has been performed the measured time value difference is sent to the first network node 111.

The measured time value difference such as the ping response received by the first network node 111 from the second network node 112 may comprise feedback from UE 120 such e.g. CQI, PHR and information about conditions of UL from the UE 120 to the second network node 112, that the second network node 112 monitors like UL Signal to Noise and Interference. There may also be information included about HARQ/RLC retransmissions statistics besides the timing information needed for RTT estimation.

One alternative to transfer this kind of information over X2 UP is to complement the solution used for DC flow control with monitoring and ping results.

In these embodiments the first network node 111 uses the feedback in the second message together with the time value difference measured by the second network node 112 sent to the first network node 111 to evaluate how the connection shall be used.

Action 506

In this optional action, the second network node 112 receives an indication from the first network node 111. The indication relates to an evaluated condition of the connection based on the feedback and a measured time value difference: The measured time value difference is based on the received first message and received second message.

The second network node 112 may use the indication to know that it is a probing effort and thus prepare for sending feedback to first network node 111.

The DC split bearer probing way of evaluation is intended to be used for SeNB cell candidates in other eNBs, such as the second network node 112, than the first network node 111, this is according to the first scenario. However the concept of using e.g. a smaller amount of data to probe the connection via the second cell 102 may also be used for Intra eNB SCell candidates for CA according to the second scenario, e.g. at high load before a large amount of data is offered to that connection.

The probing and evaluation according to embodiments herein are used instead of setting up measurement gaps which may lead to reduced UE peak rate. This is since the UE will search, detect and measure e.g. Reference Signal Received Power (RSRP) and Reference Signal Received Quality (RSRQ) on the SeNB and then let the MeNB guess that the RSRP and RSRQ is good enough, such as e.g. above a threshold to allow for a connection attempt by setting up the SeNB path. This is a rather time consuming operation since UE can take seconds before detection and reporting of the SeNB cell.

Measurement gaps can be avoided altogether according to embodiments herein by setting up the second cell 102 connection and use that for probing. When the UE 120 synchronizes to the second network node 112 cells DL, and the second network node 112 is able to detect the UE transmission in UL, such as the scheduling request, the first network node 111 knows immediately that a bidirectional connection has been established. The second network node 112 also gets the first feedback for link adaptation to start with and is able to send the correct feedback back to first network node 111 to set the flow control correct from the beginning.

If the probing is done frequently then this scheme is much faster than the measurement gap scheme.

In order to get a good performance with DC or CA it is recommended to be fast in using a cell when a coverage opportunity shows up, which embodiments herein provide. Also the second network node 112 or UE 120 Radio Link Failure (RLF) detection, or detection of losing the coverage or opportunity is much easier since the bidirectional connection with HARQ feedback will provide that information rather fast.

Figure 7:
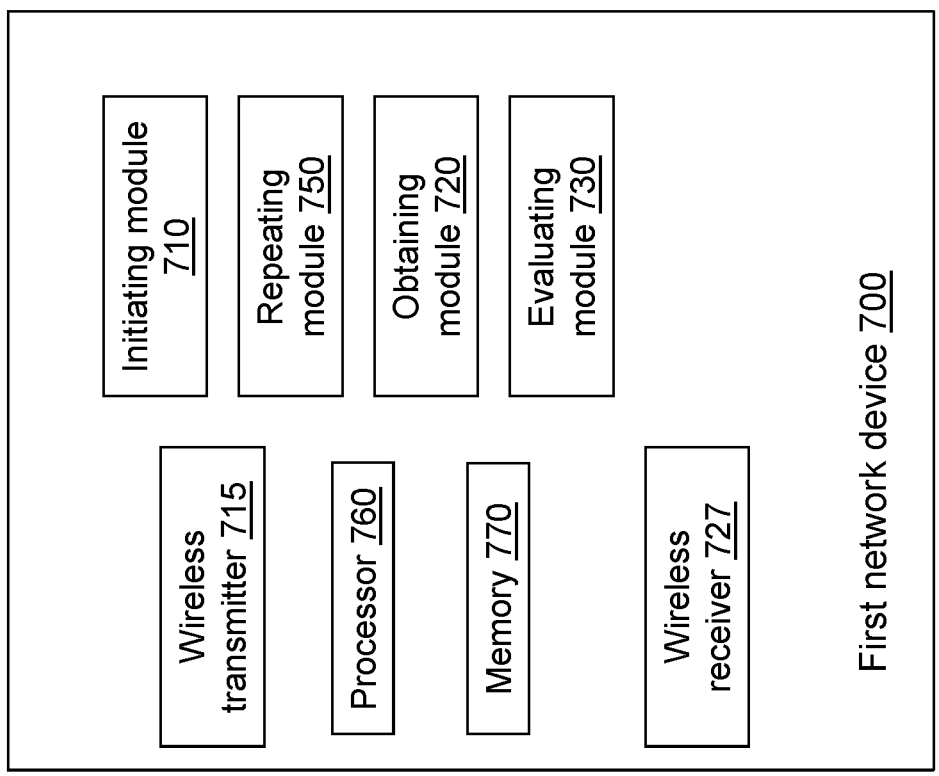
FIG. 7 is a schematic block diagram illustrating embodiments of a first network node.

To perform the method actions for evaluating a connection between a first network node 111 and the UE 120, via the Second Cell 102, described above in relation to FIGS. 3, 4a and 4b, a first network device 700 may comprise the following arrangement depicted in FIG. 7. The first network node 111 is adapted to serve a first cell 101. The first network device 700 may be any of the first network node 111 and the first distributed node 131 or any other network node.

The first network device 700 is configured to, e.g. by means of an initiating module 710 configured to, initiate to send, from the first network node 111 to the UE 120 via the second cell 102, a first message comprising a trigger for the UE 120 to respond by sending a second message comprising feedback relating to the connection to the second cell 102.

The first message may e.g. comprise a limited amount of data, which is limited to the amount of data that is required by the UE 120 to be able to respond to. According to some embodiments, the first message comprises no user data.

The initiating module 710 may be comprised in a wireless transmitter 715 in the first network node 111.

The first network device 700 is further configured to, e.g. by means of an obtaining module 720 configured to, obtain a time value difference between the sending of said first message and the receipt of said second message in the first network node 111. The second message comprises the feedback relating to the connection sent from the UE 120 in response to the first message. The initiating module 710 may be comprised in a wireless receiver 727 in the first network device 700.

In some embodiments, the time value difference for sending of the first message and receiving of the second message in the second cell 102 is adapted to be obtained by being measured by the first network node 111.

In some alternative embodiments, the time value difference for sending of the first message and receiving of the second message in the second cell 102 is adapted to be obtained by being received from the second network node 112.

The time value difference may relate to a first round trip path comprising the first network node 111, a second network node 112, the UE 120, the second network node 112, the first network node 111, or the time value difference may relate to a second round trip path comprising the second network node 112, the UE 120, the second network node 112, or wherein the time value difference may relate to a third round trip path comprising the first network node 111, the second network node 112, and the first network node 111.

The third round trip path may be estimated based on the first round trip path and the second round trip path.

The first network device 700 is further configured to, e.g. by means of an evaluating module 730 configured to, evaluate how the connection shall be used based on the obtained time value difference and the received feedback.

The first network device 700 is further configured to, e.g. by means of a configuring module 740 configured to, configure the UE 120 to send and receive a transmission from the second cell 102.

The first network device 700 is further configured to, e.g. by means of a repeating module 750 configured to, repeat to initiate sending to the UE 120 via the second cell 102, the first message comprising a trigger for the UE 120 to respond by sending a second message comprising feedback relating to the connection to the second cell 102, when not receiving within a time period any second message comprising feedback from the UE 120 in response to the first message. The repeating module 750 may be comprised in the wireless transmitter 715 in the first network device 700.

In some embodiments, the first network node 111 is a MeNB serving a first cell 101, the second network node 112 is a SeNB serving the second cell 102, and the connection relates to DC. In these embodiments, the second message comprising the feedback from the UE 120 is received from the UE 120 via the second cell 102.

In some other embodiments, the first network node 111 is the same node as the second network node 112, i.e. there is only a first network node 111, serving both the first cell and the second cell 102, and the connection relates to CA. In these embodiments, the second message comprising the feedback from the UE 120 is received from the UE 120 via the first cell 101.

Embodiments herein further relates to a computer program comprising instructions, which when executed by at least one processor 760, cause the at least one processor 760 to perform the above actions 301-307. The at least one processor 760 may be comprised in the first network device 700 or any other node such as e.g. an eNB, an RNC, an MME, an AC, or may be distributed in a number of nodes related to the wireless communications network 100 such as e.g. an eNB, an RNC, an MME, an AC.

Embodiments herein yet further relates to a carrier comprising the computer program. The carrier is one of an electronic signal, an optical signal, an electromagnetic signal, a magnetic signal, an electric signal, a radio signal, a microwave signal, or a computer-readable storage medium.

Thus the embodiments herein may be implemented through one or more processors, such as a processor 760 in the first network device 700 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first network device 700. One such carrier may be in the form of a CD ROM disc. It is however feasible with other data carriers such as a memory stick. The computer program code may furthermore be provided as pure program code on a server and downloaded to the first network device 700.

The first network device 700 may further comprise a memory 770 comprising one or more memory units. The memory 770 comprises instructions executable by the processor 760. The memory 770 is arranged to be used to store e.g. configurations, time value differences, feedback, evaluations, data, and applications to perform the methods herein when being executed in the first network device 700.

Those skilled in the art will also appreciate that the modules in the first network node 111 described above may refer to a combination of analog and digital circuits, and/or one or more processors configured with software and/or firmware, e.g. stored in the memory 770, that when executed by the one or more processors such as the processor 760 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8:
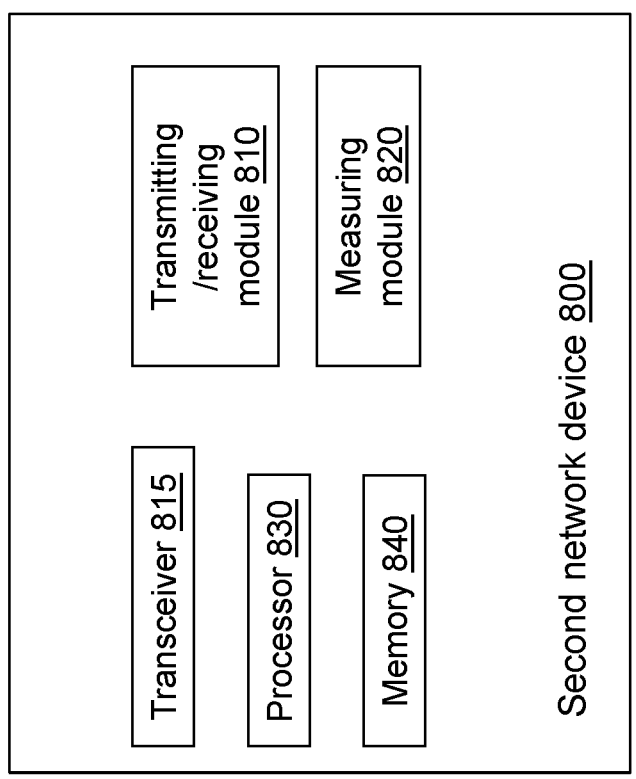
FIG. 8 is a schematic block diagram illustrating embodiments of a second network node.

To perform the method actions for assisting the first network node 111 in evaluating a connection for the User Equipment, UE, 120 via the second cell 102, described above in relation to FIGS. 4a, 4b, and 5, a second network device 800 may comprise the following arrangement depicted in FIG. 8. As mentioned above, the first network node 111 is adapted to be a MeNB, and the second network node 112 is adapted to be an SeNB serving the second cell 102.

The second network device 800 may be any one out of: the second network node 112, the second distributed node 132 or any other network node.

The second network device 800 is configured to, e.g. by means of a transmitting/receiving module 810 configured to, receive a first message from the first network node 111 and forward the first message to the UE 120. The first message is adapted to comprise a trigger the UE 120 to respond by sending a second message to the second cell 102.

The transmitting/receiving module 810 may be comprised in a wireless transceiver 815 in the second network node 112.

The second network device 800 is further configured to, e.g. by means of the transmitting/receiving module 810 further being configured to, receive from the UE 120 the second message. The second message comprises feedback from the UE 120. The feedback relates to the condition of said connection, and the feedback is a response to the first message.

The second network device 800 is further configured to, e.g. by means of the transmitting/receiving module 810 configured to, send the second message to the first network node 111. The second message is used by the first network node 111 to evaluate how the connection shall be used.

The second network device 800 may further be configured to, e.g. by means of a measuring module 820 configured to, measure a time value difference, based on the received first message and received second message.

The second network device 800 may further be configured to, e.g. by means the transmitting/receiving module 810 configured to, send the measured time value difference to the first network node 111.

The second network device 800 may further be configured to, e.g. by means the transmitting/receiving module 810 configured to, receive an indication from the first network node 111. The indication relates to an evaluated condition of the connection based on the feedback and a measured time value difference. The measured time value difference is based on the received first message and received second message.

Embodiments herein further relates to computer program comprising instructions, which when executed by at least one processor 830, cause the at least one processor 830 to perform any of the actions 501-506.

The at least one processor 760 may be comprised in the second network device 800 or any other node such as e.g. a WiFi AC node, or may be distributed in a number of nodes related to the wireless communications network 100.

Embodiments herein yet further relates to a carrier comprising the computer program. The carrier is one of an electronic signal, an optical signal, an electromagnetic signal, a magnetic signal, an electric signal, a radio signal, a microwave signal, or a computer-readable storage medium.

Thus the embodiments herein may be implemented through one or more processors, such as a processor 830 in the second network device 800 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the second network device 800. One such carrier may be in the form of a CD ROM disc. It is however feasible with other data carriers such as a memory stick. The computer program code may furthermore be provided as pure program code on a server and downloaded to the second network device 800.

The second network device 800 may further comprise a memory 840 comprising one or more memory units. The memory 840 comprises instructions executable by the processor 830. The memory 840 is arranged to be used to store e.g. configurations, time value differences, feedback, evaluations, data, and applications to perform the methods herein when being executed in the second network node 112.

Those skilled in the art will also appreciate that the modules in the second network node 112 described above may refer to a combination of analogue and digital circuits, and/or one or more processors configured with software and/or firmware, e.g. stored in the memory 840, that when executed by the one or more processors such as the processor 830 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "device", "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method for evaluating a connection between a first network node, that serves a first cell, and a User Equipment (UE), in which the connection is via a second network node that serves a second cell, wherein the first network node and the second network node are different network nodes to provide a dual connectivity to the UE, the method comprising:

configuring the UE, via the first cell of the first network node, to send and receive a transmission via the second cell of the second network node;

initiate sending, from the first network node to the UE via the second cell of the second network node, a first message comprising a trigger for the UE to respond by sending a second message to the second network node via the second cell, the second message comprising feedback relating to quality of the connection;

when the second message comprising the feedback from the UE in response to the first message is not received within a time period, repeating initiating sending, to the UE via the second cell of the second network node, the first message comprising a trigger for the UE to respond by sending the second message comprising the feedback relating to the connection;

obtaining a time value difference between the sending of said first message and receiving of said second message in the first network node via the second cell of the second network node; and evaluating use of the connection for providing the dual connectivity to communicate with the UE using both the first network node and the second network node, based on the obtained time value difference and the feedback, wherein the connection is established by splitting bearer at a Packet Data Convergence Protocol (PDCP) layer of the first network node and rerouting the connection to the second network node.

2. The method according to claim 1, wherein the time value difference between the sending of the first message and the receiving of the second message is measured by the first network node.

3. The method according to claim 1, wherein the time value difference between the sending of the first message and the receiving of the second message is measured at the second network node.

4. The method according to claim 1,
wherein the time value difference relates to a first round trip path comprising the first network node, the second network node, the UE, the second network node, and the first network node,
or wherein the time value difference relates to a second round trip path comprising the second network node, the UE, and the second network node,
or wherein the time value difference relates to a third round trip path comprising the first network node, the second network node, and the first network node.

5. The method according to claim 4, wherein the third round trip path is estimated based on the first round trip path and the second round trip path.

6. The method according to claim 1, wherein the first message comprises a limited amount of data, which is limited to an amount of data that is required by the UE to be able to respond to the first message.

7. The method according to claim 1, wherein the first message comprises no user data.

8. The method according to claim 1, wherein the first network node is a Master eNodeB (MeNB) serving the first cell, and wherein the second network node is a Secondary eNodeB (SeNB) serving the second cell.

9. A network device for evaluating a connection between a first network node, that serves a first cell, and a User Equipment (UE), in which the connection is via a second network node that serves a second cell, wherein the first network node and the second network node are different network nodes to provide a dual connectivity to the UE, the network device is configured to:
configure the UE, via the first cell of the first network node, to send and receive a transmission via the second cell of the second network node;
after configuration of the UE, initiate to send, from the first network node to the UE via the second cell of the second network node, a first message comprising a trigger for the UE to respond by sending a second message to the second network node via the second cell, the second message comprising feedback relating to the connection;
when the second message comprising the feedback from the UE in response to the first message is not received within a time period, repeat to initiate sending, to the UE via the second cell of the second network node, the first message comprising a trigger for the UE to respond by sending the second message comprising the feedback relating to the connection;
obtain a time value difference between the sending of said first message and receiving of said second message in the first network node via the second cell of the second network node, wherein said second message comprises the feedback relating to the connection sent from the UE in response to the first message; and
evaluate use of the connection for providing the dual connectivity to communicate with the UE using both the first network node and the second network node, based on the obtained time value difference and the feedback;
wherein the connection is established by splitting bearer at a Packet Data Convergence Protocol (PDCP) layer of the first network node and rerouting the connection to the second network node.

10. The network device according to claim 9,
wherein the time value difference relates to a first round trip path comprising the first network node, the second network node, the UE, the second network node, and the first network node,
or wherein the time value difference relates to a second round trip path comprising the second network node, the UE, and the second network node,
or wherein the time value difference relates to a third round trip path comprising the first network node, the second network node, and the first network node.

11. The network device according to claim 9, wherein the first network node is a Master eNodeB (MeNB) serving the first cell, and wherein the second network node is a Secondary eNodeB (SeNB) serving the second cell.

* * * * *